April 7, 1931.  K. E. LYMAN  1,799,597
BRAKE APPLYING CONNECTION
Filed June 7, 1927   2 Sheets-Sheet 1
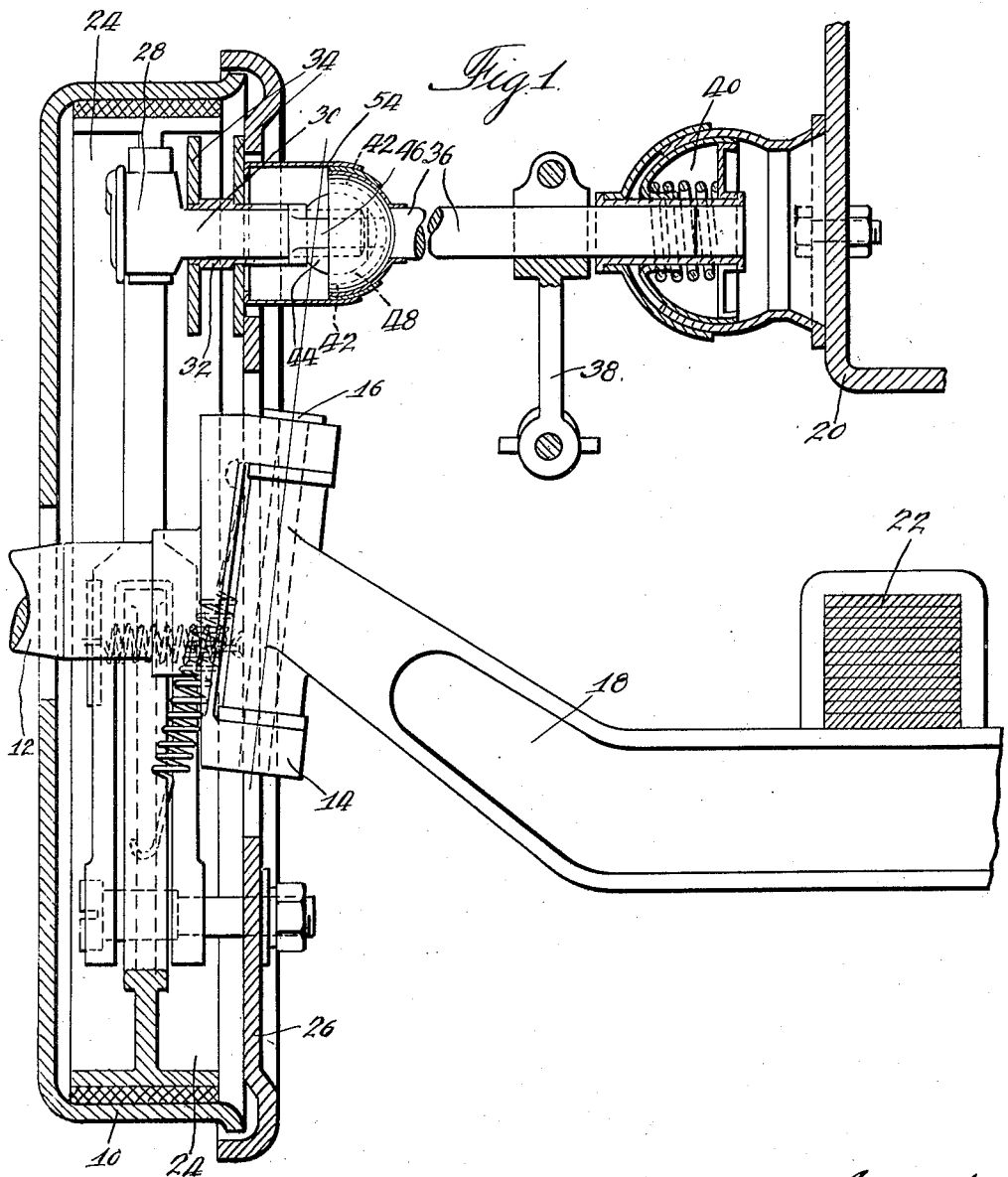
Inventor
KENNETH E. LYMAN April 7, 1931. K. E. LYMAN 1,799,597
BRAKE APPLYING CONNECTION
Filed June 7, 1927 2 Sheets-Sheet 2
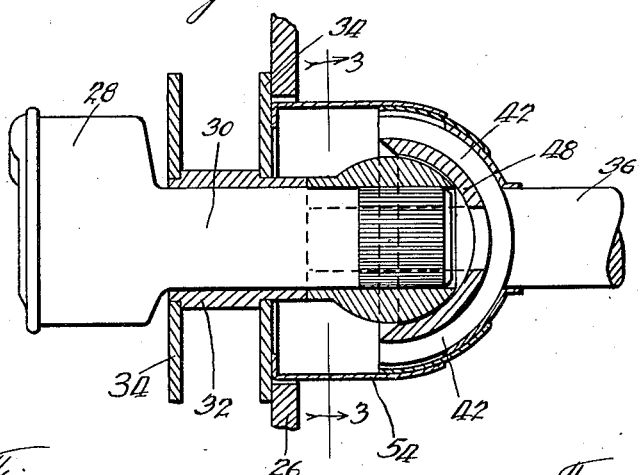
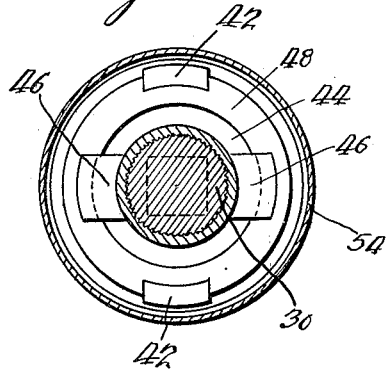
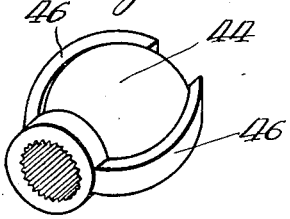
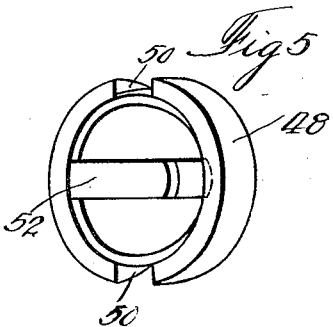
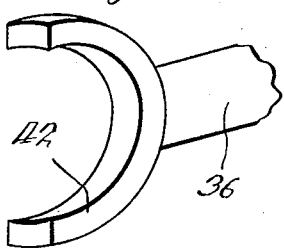
KENNETH E. LYMAN Patented Apr. 7, 1931

1,799,597

UNITED STATES PATENT OFFICE

KENNETH E. LYMAN, OF CHICAGO, ILLINOIS

BRAKE-APPLYING CONNECTION

Application filed June 7, 1927. Serial No. 197,177.

This invention relates to brakes, and is illustrated as embodied in a front wheel brake for an automobile. An object of the invention is to provide novel operating means for a brake of this character, including a connecting device or joint between the operating shaft and the camshaft or its equivalent, which device is arranged entirely on the side of the swivelling axis opposite the wheel. Thus the novel connecting device does not encroach on the rather limited space between the swivelling axis and the center of the brake, making it possible to provide a relatively long camshaft bearing.

Preferably the connecting device is a hollow hemispherical member having internal and external grooves at right angles to each other, and engaging corresponding parts on the two shafts. In order to avoid the necessity for lubrication, I prefer to make the connecting device of phenolic condensation material such as bakelite.

The above and other objects and features of the invention will be apparent from the following description of one illustrative embodiment shown in the accompanying drawings, in which:

Figure 1 is a vertical section through one front brake and associated parts, showing the shafts in front elevation;

Figure 2 is a view corresponding to part of Figure 1, but on a larger scale;

Figure 3 is a section through the brake-applying means on the line 3—3 of Figure 2;

Figure 4 is a perspective view of a novel ball adapted to be pressed onto the serrated end of the camshaft;

Figure 5 is a perspective view of the novel connecting device; and

Figure 6 is a perspective view of the end of the operating shaft.

The brake selected for illustration includes a drum 10 rotating with a wheel (not shown) mounted on the spindle 12 of a knuckle 14. The knuckle is swivelled, by a king-pin 16 or the like, to an axle 18 supporting a chassis frame 20 through the usual springs 22.

The friction means of the brake is shown as comprising shoes 24, mounted on a backing plate 26, and operated by means such as a cam 28 on a shaft 30. Shaft 30 is supported by a bushing 32, of phenolic condensation material such as bakelite, carried by two plates 34 mounted on the backing plate 26.

Shaft 30 is operated, through a novel universal joint above the king-pin 16 in the swivelling axis of the wheel, by an operating shaft 36 having an arm 38, and slidably and universally mounted at its inner end in a support 40 carried by the frame 20.

The outer end of shaft 36 is formed with arcuate arms 42, constituting a semi-circular fork. The inner end of shaft 30 is serrated, and has pressed thereon a novel ball member 44 having external ribs 46, forming in effect a fork at right angles to the fork 42.

Between the two shaft ends is arranged a novel connecting device, preferably a hollow hemispherical member 48 having external grooves 50 to receive arms 42, and having internal grooves 52 to receive the ribs 46.

It should be especially noted that the connecting device 48, substantially in its entirety, is on the opposite side of the swivelling axis from the wheel, and therefore does not encroach on the very limited space available between the swivelling axis and the center of the brake. This permits making bearing 32 considerably longer than is otherwise possible, and gives ample clearance for all the parts in any angular position of the wheel.

I prefer to make the ball 44 of steel or bronze, and the arms 42 of steel, and in order to avoid the necessity of lubrication I then make the novel member 48 of phenolic condensation material such as bakelite.

The above-described joint may be housed in a sectional stamped steel spherical casing 54 carried by the backing plate 26 together with a two-part telescoping cover cap secured to the shaft 36 at the base of the fork.

While one illustrative embodiment has been described in detail, it is not my intention to limit the scope of the invention to that particular embodiment, or otherwise than by the terms of the appended claims.

I claim:

1. Operating means for a brake on a swivelled wheel comprising, in combination with two shafts arranged end to end, a joint between the shafts adjacent the swivelling axis of the wheel including a connecting device engaging both shafts and permitting them to move universally with respect to each other and which device is arranged substantially entirely on the side of the swivelling axis opposite the wheel.

2. Operating means for a brake on a swivelled wheel comprising, in combination with two shafts arranged end to end, a joint between the shafts adjacent the swivelling axis of the wheel including a connecting device engaging the shafts and permitting movement thereof respectively about horizontal and vertical axes and which is arranged substantially entirely on the side of the swivelling axis opposite the wheel.

3. Operating means for a brake on a swiveled wheel comprising the combination with two shafts arranged end to end, one of said shafts journaled in a relatively long bearing mounted in a brake support plate, of a joint between the shafts adjacent the swiveling axis of the wheel including a connecting device engaging both shafts and permitting them to move universally with respect to each other, and which device is arranged substantially entirely on the side of the swiveling axis opposite the wheel.

In testimony whereof, I have hereunto signed my name.

KENNETH E. LYMAN.